(12) United States Patent
Yunbai

(10) Patent No.: US 11,754,807 B2
(45) Date of Patent: Sep. 12, 2023

(54) IMAGING LENS

(71) Applicant: TOKYO VISIONARY OPTICS CO., LTD., Tokyo (JP)

(72) Inventor: Huang Yunbai, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 0 days.

(21) Appl. No.: 17/125,476

(22) Filed: Dec. 17, 2020

(65) Prior Publication Data
US 2022/0050269 A1    Feb. 17, 2022

(30) Foreign Application Priority Data
Dec. 17, 2019    (JP) .................. 2019-227309

(51) Int. Cl.
*G02B 13/00*    (2006.01)
*G02B 9/34*    (2006.01)

(52) U.S. Cl.
CPC ............ *G02B 13/004* (2013.01); *G02B 9/34* (2013.01)

(58) Field of Classification Search
CPC .................. G02B 13/004; G02B 9/34
See application file for complete search history.

(56) References Cited

U.S. PATENT DOCUMENTS

2021/0048614 A1*   2/2021   Shi .................. G02B 13/06

FOREIGN PATENT DOCUMENTS

CN          101241224 A      8/2008

* cited by examiner

*Primary Examiner* — Joseph P Martinez
(74) *Attorney, Agent, or Firm* — Hamre, Schumann, Mueller & Larson, P.C.

(57) ABSTRACT

There is provided an imaging lens with excellent optical characteristics which satisfies demand of a low profile and a low F-number. An imaging lens comprises in order from an object side to an image side, a first lens with positive refractive power being formed in a meniscus shape having an object-side surface being convex in a paraxial region, a second lens with negative refractive power in a paraxial region, a third lens with positive refractive power having an object-side surface being concave in a paraxial region, and a fourth lens with negative refractive power having an image-side surface being concave in a paraxial region, and predetermined conditional expressions are satisfied.

7 Claims, 6 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN101241224A) discloses an imaging lens comprising, in order from an object side, a first lens with positive refractive power, a second lens with negative refractive power, a third lens with positive refractive power having at least one aspheric surface, and a fourth lens with negative refractive power having at least one aspheric surface, and a relationship between a focal length of the overall optical system and a focal length of the first lens satisfies a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (a surface being convex)", "a concave surface (a surface being concave)" or "a flat surface (a surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power being formed in a meniscus shape having an object-side surface being convex in a paraxial region, a second lens with negative refractive power in a paraxial region, a third lens with positive refractive power having an object-side surface being concave in a paraxial region, and a fourth lens with negative refractive power having an image-side surface being concave in a paraxial region.

The first lens achieves reduction in a profile of the imaging lens by strengthening the refractive power. Furthermore, when the first lens is formed in a meniscus shape having an object-side surface being convex in a paraxial region, spherical aberration, astigmatism, and distortion are suppressed.

The second lens properly corrects chromatic aberration, the spherical aberration, coma aberration, the astigmatism, and the distortion.

The third lens achieves reduction in a profile of the imaging lens, and properly corrects the coma aberration, the astigmatism, and the distortion. Furthermore, when the third lens has the object-side surface being concave in the paraxial region, the astigmatism and the distortion can be more properly corrected.

The fourth lens properly corrects the chromatic aberration, the astigmatism, field curvature, and the distortion. Furthermore, when the fourth lens has the image-side surface being concave in the paraxial region, a back focus is secured while maintaining the low profile.

According to the imaging lens having an above-described configuration, it is preferable that an object-side surface of the second lens is concave in the paraxial region.

When the object-side surface of the second lens is concave in the paraxial region, the coma aberration and the astigmatism can be properly corrected.

According to the imaging lens having the above-described configuration, it is preferable that the following conditional expression (1) is satisfied:

$$9.00 < vd2 < 29.00 \tag{1}$$

where
$vd2$: an abbe number at d-ray of the second lens.

The conditional expression (1) defines an appropriate range of the abbe number at d-ray of the second lens. By satisfying the conditional expression (1), the chromatic aberration can be properly corrected.

According to the imaging lens having the above-described configuration, it is preferable that the following conditional expression (2) is satisfied:

$$0.55 < r2/f < 5.25 \tag{2}$$

where
$r2$: a paraxial curvature radius of an image-side surface of the first lens, and
$f$: a focal length of the overall optical system of the imaging lens.

The conditional expression (2) defines an appropriate range of the paraxial curvature radius of the image-side surface of the first lens. By satisfying the conditional expression (2), the astigmatism and the distortion can be properly corrected.

According to the imaging lens having the above-described configuration, it is preferable that the following conditional expression (3) is satisfied:

$$2.15 < r4/f < 6.00 \tag{3}$$

where
$r4$: a paraxial curvature radius of an image-side surface of the second lens, and
$f$: a focal length of the overall optical system of the imaging lens.

The conditional expression (3) defines an appropriate range of the paraxial curvature radius of the image-side surface of the second lens. By satisfying the conditional expression (3), the astigmatism and the distortion can be properly corrected.

According to the imaging lens having the above-described configuration, it is preferable that the following conditional expression (4) is satisfied:

$$35.50 < r7/T3 < 235.00 \qquad (4)$$

where r7: a paraxial curvature radius of an object-side surface of the fourth lens, and T3: a distance along the optical axis from an image-side surface of the third lens to an object-side surface of the fourth lens.

The conditional expression (4) defines an appropriate range of a relationship between the paraxial curvature radius of the object-side surface of the fourth lens and the distance along the optical axis from the image-side surface of the third lens to the object-side surface of the fourth lens. By satisfying the conditional expression (4), the astigmatism, the field curvature, and the distortion can be properly corrected.

According to the imaging lens having the above-described configuration, it is preferable that the following conditional expression (5) is satisfied:

$$2.50 < (T2/f) \times 100 < 10.50 \qquad (5)$$

where

T2: a distance along the optical axis from an image-side surface of the second lens to an object-side surface of the third lens, and f: a focal length of the overall optical system of the imaging lens.

The conditional expression (5) defines an appropriate range of the distance along the optical axis from the image-side surface of the second lens to the object-side surface of the third lens. By satisfying the conditional expression (5), reduction in the profile can be achieved, and the astigmatism and the distortion can be properly corrected.

According to the imaging lens having the above-described configuration, it is preferable that the following conditional expression (6) is satisfied:

$$8.00 < r7/T2 < 65.00 \qquad (6)$$

where r7: a paraxial curvature radius of an object-side surface of the fourth lens, and T2: a distance along the optical axis from an image-side surface of the second lens to an object-side surface of the third lens.

The conditional expression (6) defines an appropriate range of a relationship between the paraxial curvature radius of the object-side surface of the fourth lens and the distance along the optical axis from the image-side surface of the second lens to the object-side surface of the third lens. By satisfying the conditional expression (6), the astigmatism, the field curvature, and the distortion can be properly corrected.

According to the imaging lens having the above-described configuration, it is preferable that the following conditional expression (7) is satisfied:

$$5.00 < r2/r8 < 18.00 \qquad (7)$$

where r2: a paraxial curvature radius of an image-side surface of the first lens, and r8: a paraxial curvature radius of an image-side surface of the fourth lens.

The conditional expression (7) defines an appropriate range of a relationship between the paraxial curvature radius of the image-side surface of the first lens and the paraxial curvature radius of the image-side surface of the fourth lens. By satisfying the conditional expression (7), the astigmatism, the field curvature, and the distortion can be properly corrected.

According to the imaging lens having the above-described configuration, it is preferable that the following conditional expression (8) is satisfied:

$$5.00 < r4/r8 < 20.00 \qquad (8)$$

where r4: a paraxial curvature radius of an image-side surface of the second lens, and r8: a paraxial curvature radius of an image-side surface of the fourth lens.

The conditional expression (8) defines an appropriate range of a relationship between the paraxial curvature radius of the image-side surface of the second lens and the paraxial curvature radius of the image-side surface of the fourth lens. By satisfying the conditional expression (8), the astigmatism, the field curvature, and the distortion can be properly corrected.

According to the imaging lens having the above-described configuration, it is preferable that the following conditional expression (9) is satisfied:

$$2.95 < f2/f4 < 5.70 \qquad (9)$$

where f2: a focal length of the second lens, and f4: a focal length of the fourth lens.

The conditional expression (9) defines an appropriate range of a relationship between the focal length of the second lens and the focal length of the fourth lens. By satisfying the conditional expression (9), refractive powers of the second lens and the fourth lens can be appropriately balanced. As a result, the chromatic aberration, the coma aberration, the astigmatism, the field curvature, and the distortion can be properly corrected.

According to the imaging lens having the above-described configuration, it is preferable that the following conditional expression (10) is satisfied:

$$0.50 < vd3/vd4 < 1.50 \qquad (10)$$

where vd3: an abbe number at d-ray of the third lens, and vd4: an abbe number at d-ray of the fourth lens.

The conditional expression (10) defines appropriate ranges of the abbe numbers at d-ray of the third lens and the fourth lens, respectively. By satisfying the conditional expression (10), the chromatic aberration can be properly corrected.

According to the imaging lens having the above-described configuration, it is preferable that the following conditional expression (11) is satisfied:

$$0.20 < T2/T1 < 0.90 \qquad (11)$$

where

T2: a distance along the optical axis from an image-side surface of the second lens to an object-side surface of the third lens, and T1: a distance along the optical axis from an image-side surface of the first lens to an object-side surface of the second lens.

The conditional expression (11) defines an appropriate range of a relationship between the distance along the optical axis from the image-side surface of the second lens to the object-side surface of the third lens and the distance along the optical axis from the image-side surface of the first lens to the object-side surface of the second lens. By satisfying the conditional expression (11), the second lens is arranged at an optimum position, and aberration correction function of the lens becomes more effective. As a result, reduction in the profile can be achieved and the coma aberration, the astigmatism and the distortion can be properly corrected.

According to the imaging lens having the above-described configuration, it is preferable that the following conditional expression (12) is satisfied:

$$-12.50 < r3/f < -1.40 \tag{12}$$

where r3: a paraxial curvature radius of an object-side surface of the second lens, and f: a focal length of the overall optical system of the imaging lens.

The conditional expression (12) defines an appropriate range of the paraxial curvature radius of the object-side surface of the second lens. By satisfying the conditional expression (12), the coma aberration and the astigmatism can be properly corrected.

According to the imaging lens having the above-described configuration, it is preferable that the following conditional expression (13) is satisfied:

$$-22.00 < r3/r7 < -0.50 \tag{13}$$

where r3: a paraxial curvature radius of an object-side surface of the second lens, and r7: a paraxial curvature radius of an object-side surface of the fourth lens.

The conditional expression (13) defines an appropriate range of a relationship between the paraxial curvature radius of the object-side surface of the second lens and the paraxial curvature radius of the object-side surface of the fourth lens. By satisfying the conditional expression (13), the coma aberration, the astigmatism, the field curvature, and the distortion can be properly corrected.

According to the imaging lens having the above-described configuration, it is preferable that the following conditional expression (14) is satisfied:

$$-200.00 < r5/T3 < -42.50 \tag{14}$$

where r5: a paraxial curvature radius of an object-side surface of the third lens, and T3: a distance along the optical axis from an image-side surface of the third lens to an object-side surface of the fourth lens.

The conditional expression (14) defines an appropriate range of a relationship between the paraxial curvature radius of the object-side surface of the third lens and the distance along the optical axis from the image-side surface of the third lens to the object-side surface of the fourth lens. By satisfying the conditional expression (14), the astigmatism and the distortion can be properly corrected.

According to the imaging lens having the above-described configuration, it is preferable that the following conditional expression (15) is satisfied:

$$-1.50 < r2/r3 < -0.10 \tag{15}$$

where r2: a paraxial curvature radius of an image-side surface of the first lens, and r3: a paraxial curvature radius of an object-side surface of the second lens.

The conditional expression (15) defines an appropriate range of a relationship between the paraxial curvature radius of the image-side surface of the first lens and the paraxial curvature radius of the object-side surface of the second lens. By satisfying the conditional expression (15), the coma aberration, the astigmatism, and the distortion can be properly corrected.

According to the imaging lens having the above-described configuration, it is preferable that the following conditional expression (16) is satisfied:

$$-3.50 < r3/r4 < -0.10 \tag{16}$$

where r3: a paraxial curvature radius of an object-side surface of the second lens, and r4: a paraxial curvature radius of an image-side surface of the second lens.

The conditional expression (16) defines an appropriate range of a relationship between the paraxial curvature radius of the object-side surface of the second lens and the paraxial curvature radius of the image-side surface of the second lens. By satisfying the conditional expression (16), the coma aberration, the astigmatism, and the distortion can be properly corrected.

According to the imaging lens having the above-described configuration, it is preferable that the following conditional expression (17) is satisfied:

$$0.50 < r8/D4 < 2.00 \tag{17}$$

where r8: a paraxial curvature radius of an image-side surface of the fourth lens, and D4: a thickness along the optical axis of the fourth lens.

The conditional expression (17) defines an appropriate range of a relationship between the paraxial curvature radius of the image-side surface of the fourth lens and the thickness along the optical axis of the fourth lens. By satisfying the conditional expression (17), reduction in the profile can be achieved, and the astigmatism, the field curvature, and the distortion can be properly corrected.

According to the imaging lens having the above-described configuration, it is preferable that the following conditional expression (18) is satisfied:

$$5.00 < (D1/f1) \times 100 < 14.00 \tag{18}$$

where

D1: a thickness along the optical axis of the first lens, and f1: a focal length of the first lens.

The conditional expression (18) defines an appropriate range of a relationship between the thickness along the optical axis of the first lens and the focal length of the first lens. By satisfying the conditional expression (18), reduction in the profile can be achieved, and the spherical aberration, the astigmatism, and the distortion can be properly corrected.

According to the imaging lens having the above-described configuration, it is preferable that the following conditional expression (19) is satisfied:

$$-6.50 < f2/f < -2.00 \quad (19)$$

where f2: a focal length of the second lens, and f: a focal length of the overall optical system of the imaging lens.

The conditional expression (19) defines an appropriate range of the focal length of the second lens. By satisfying the conditional expression (19), the chromatic aberration, the spherical aberration, the coma aberration, the astigmatism, and the distortion can be properly corrected.

According to the imaging lens having the above-described configuration, it is preferable that the following conditional expression (20) is satisfied:

$$-120.00 < f2/T2 < -20.00 \quad (20)$$

where f2: a focal length of the second lens, and

T2: a distance along the optical axis from an image-side surface of the second lens to an object-side surface of the third lens.

The conditional expression (20) defines an appropriate range of a relationship between the focal length of the second lens and the distance along the optical axis from the image-side surface of the second lens to the object-side surface of the third lens. By satisfying the conditional expression (20), reduction in the profile can be achieved, and the chromatic aberration, the spherical aberration, the coma aberration, the astigmatism, and the distortion can be properly corrected.

Effect of Invention

According to the present invention, there can be provided an imaging lens with high resolution which satisfies demand of the low profile and the low F-number in well balance and properly corrects aberrations.

DETAILED DESCRIPTION OF THE PREFERRED EMBODIMENT

Figure 1:
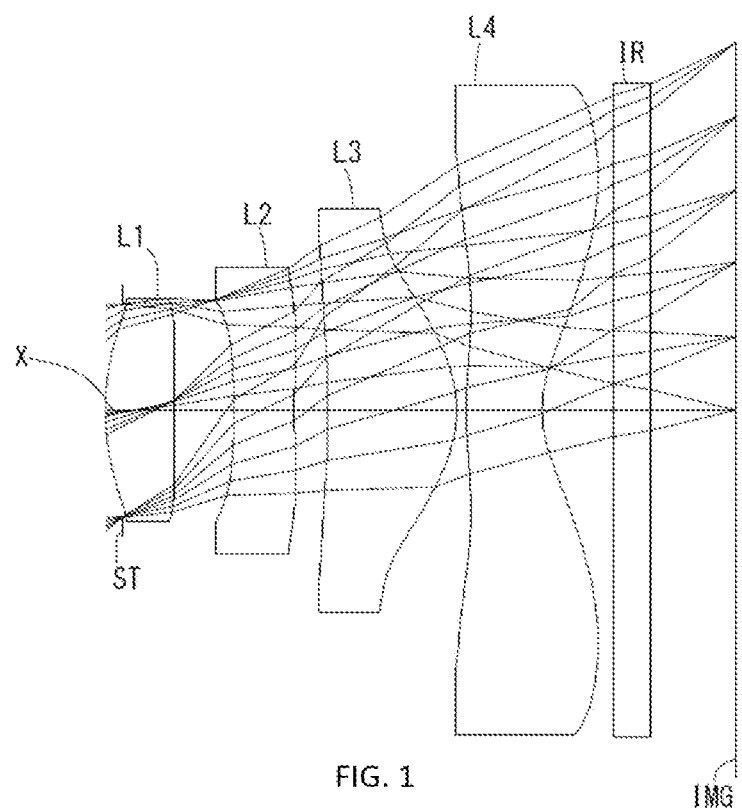
FIG. 1 is a schematic view showing an imaging lens in Example 1 according to the present invention.

Hereinafter, the preferred embodiment of the present invention will be described in detail referring to the accompanying drawings.

FIGS. 1, 3, 5 and 7 are schematic views of the imaging lenses in Examples 1 to 4 according to the embodiments of the present invention, respectively.

An imaging lens according to the present embodiments comprises, in order from an object side to an image side, a first lens L1 with positive refractive power being formed in a meniscus shape having an object-side surface being convex in a paraxial region, a second L2 lens with negative refractive power in a paraxial region, a third lens L3 with positive refractive power having an object-side surface being concave in a paraxial region, and a fourth lens L4 with negative refractive power having an image-side surface being concave in a paraxial region.

A filter IR such as an IR cut filter and a cover glass are arranged between the fourth lens L4 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power and is formed in a meniscus shape having the object-side being convex and an image-side surface being concave in a paraxial region (near the optical axis X). Therefore, reduction in a profile is achieved, and astigmatism and distortion are suppressed by strengthening the refractive power. Furthermore, when the first lens L1 is formed in the meniscus shape having the object-side surface being convex in the paraxial region, spherical aberration, the astigmatism, and the distortion are suppressed.

The second lens L2 has the negative refractive power and is formed in a biconcave shape having an object-side surface and an image-side surface being concave in a paraxial region (near the optical axis X). Therefore, chromatic aberration, the spherical aberration, coma aberration, the astigmatism and the distortion are properly corrected.

The third lens L3 has the positive refractive power and is formed in a meniscus shape having the object-side being concave and an image-side surface being convex in a paraxial region (near the optical axis X). Therefore, reduction in the profile is achieved, and the coma aberration, the astigmatism, and the distortion are properly corrected. Furthermore, when the third lens L3 has the object-side surface being concave in the paraxial region, the astigmatism and the distortion are more properly corrected.

The fourth lens L4 has the negative refractive power and is formed in a meniscus shape having an object-side being convex and the image-side surface being concave in a paraxial region (near the optical axis X). Therefore, the chromatic aberration, the astigmatism, the field curvature, and the distortion are properly corrected. Furthermore, when the fourth lens L4 has the image-side surface being concave in the paraxial region, a back focus is secured while maintaining the low profile.

Regarding the imaging lens according to the present embodiments, it is preferable that all lenses of the first lens L1 to the fourth lens L4 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost becomes possible.

Furthermore, the imaging lens according to the present embodiments makes manufacturing facilitated by using a plastic material for all lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (20).

$$9.00 < vd2 < 29.00 \tag{1}$$

$$0.55 < r2/f < 5.25 \tag{2}$$

$$2.15 < r4/f < 6.00 \tag{3}$$

$$35.50 < r7/T3 < 235.00 \tag{4}$$

$$2.50 < (T2/f) \times 100 < 10.50 \tag{5}$$

$$8.00 < r7/T2 < 65.00 \tag{6}$$

$$5.00 < r2/r8 < 18.00 \tag{7}$$

$$5.00 < r4/r8 < 20.00 \tag{8}$$

$$2.95 < f2/f4 < 5.70 \tag{9}$$

$$0.50 < vd3/vd4 < 1.50 \tag{10}$$

$$0.20 < T2/T1 < 0.90 \tag{11}$$

$$-12.50 < r3/f < -1.40 \tag{12}$$

$$-22.00 < r3/r7 < -0.50 \tag{13}$$

$$-200.00 < r5/T3 < -42.50 \tag{14}$$

$$-1.50 < r2/r3 < -0.10 \tag{15}$$

$$-3.50 < r3/r4 < -0.10 \tag{16}$$

$$0.50 < r8/D4 < 2.00 \tag{17}$$

$$5.00 < (D1/f1) \times 100 < 14.00 \tag{18}$$

$$-6.50 < f2/f < -2.00 \tag{19}$$

$$-120.00 < f2/T2 < -20.00 \tag{20}$$

where vd2: an abbe number at d-ray of the second lens L2,
vd3: an abbe number at d-ray of the third lens L3,
vd4: an abbe number at d-ray of the fourth lens L4,
D1: a thickness along the optical axis X of the first lens L1,
D4: a thickness along the optical axis X of the fourth lens L4,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T3: a distance along the optical axis X from an image-side surface of the third lens L3 to an object-side surface of the fourth lens L4,
f: a focal length of the overall optical system of the imaging lens,
f1: a focal length of the first lens L1,
f2: a focal length of the second lens L2,
f4: a focal length of the fourth lens L4,
r2: a paraxial curvature radius of an image-side surface of the first lens L1,
r3: a paraxial curvature radius of an object-side surface of the second lens L2,
r4: a paraxial curvature radius of an image-side surface of the second lens L2,
r5: a paraxial curvature radius of an object-side surface of the third lens L3,
r7: a paraxial curvature radius of an object-side surface of the fourth lens L4, and
r8: a paraxial curvature radius of an image-side surface of the fourth lens L4.

It is not necessary to satisfy the above all conditional expressions, and by satisfying the conditional expression individually, operational advantage corresponding to each conditional expression can be obtained.

The imaging lens according to the present embodiments shows further preferable effect by satisfying the following conditional expressions (1a) to (20a).

$$14.50 < vd2 < 24.00 \tag{1a}$$

$$1.15 < r2/f < 4.25 \tag{2a}$$

$$2.35 < r4/f < 5.10 \tag{3a}$$

$$40.50 < r7/T3 < 210.00 \tag{4a}$$

$$4.00 < (T2/f) \times 100 < 9.50 \tag{5a}$$

$$9.00 < r7/T2 < 54.00 \tag{6a}$$

$$5.70 < r2/r8 < 16.00 \tag{7a}$$

$$8.00 < r4/r8 < 18.00 \tag{8a}$$

$$3.20 < f2/f4 < 5.00 \tag{9a}$$

$$0.75 < vd3/vd4 < 1.25 \tag{10a}$$

$$0.35 < T2/T1 < 0.75 \tag{11a}$$

$$-10.50 < r3/f < -2.20 \tag{12a}$$

$$-18.50 < r3/r7 < -1.00 \tag{13a}$$

$$-165.00 < r5/T3 < -46.00 \tag{14a}$$

$$-1.25 < r2/r3 < -0.15 \tag{15a}$$

$$-2.50 < r3/r4 < -0.60 \tag{16a}$$

$$0.90 < r8/D4 < 1.80 \tag{17a}$$

$$9.00 < (D1/f1) \times 100 < 13.00 \tag{18a}$$

$$-5.25 < f2/f < -2.15 \tag{19a}$$

$$-95.00 < f2/T2 < -23.00 \tag{20a}$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$ [Equation 1]

Next, examples of the imaging lens according to this embodiment will be explained. In each example, f denotes a focal length of the overall optical system of the imaging lens, Fno denotes an F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 |
|---|
| Unit mm |

| f = 2.49 |
|---|
| Fno = 2.00 |
| ω(°) = 39.2 |
| ih = 2.1 |
| TTL = 3.47 |

| Surface Data | | | | | |
|---|---|---|---|---|---|
| i | r | d | Nd | vd | |
| (Object) | Infinity | Infinity | | | |
| 1(Stop) | Infinity | −0.1000 | | | |
| 2* | 1.4308 | 0.3849 | 1.544 | 55.93 | (vd1) |
| 3* | 8.4082 | 0.3366 | | | |
| 4* | −8.9217 | 0.3403 | 1.671 | 19.24 | (vd2) |
| 5* | 6.5302 | 0.1890 | | | |
| 6* | −5.6527 | 0.7233 | 1.535 | 55.69 | (vd3) |
| 7* | −0.6812 | 0.0546 | | | |
| 8* | 2.4834 | 0.4266 | 1.535 | 55.69 | (vd4) |
| 9* | 0.5998 | 0.4000 | | | |
| 10 | Infinity | 0.2100 | 1.517 | 64.20 | |
| 11 | Infinity | 0.4769 | | | |
| Image Plan | Infinity | | | | |

| Constituent Lens Data | | |
|---|---|---|
| Lens | Start Surface | Focal Length |
| 1 | 2 | 3.107 |
| 2 | 4 | −5.572 |
| 3 | 6 | 1.378 |
| 4 | 8 | −1.606 |

| Aspheric Surface Data | | | | |
|---|---|---|---|---|
| | Second Surface | Third Surface | Fourth Surface | Fifth Surface |
| k | −4.562216E−01 | −2.356106E−02 | 6.726057E+00 | 4.836478E+01 |
| A4 | 3.635249E−01 | −1.017609E−01 | −8.843862E−01 | −2.943685E−01 |
| A6 | −8.004879E+00 | −2.763175E+00 | 1.021918E+01 | −1.653854E−01 |
| A8 | 8.897836E+01 | 3.971314E+01 | −1.430602E+02 | 4.449400E+00 |
| A10 | −5.896316E+02 | −3.589549E+02 | 1.204697E+03 | −3.201803E+01 |
| A12 | 2.314612E+03 | 1.934719E+03 | −6.410303E+03 | 1.211379E+02 |
| A14 | −5.131914E+03 | −6.391706E+03 | 2.154849E+04 | −2.740856E+02 |
| A16 | 5.182906E+03 | 1.265414E+04 | −4.430068E+04 | 3.767683E+02 |
| A18 | 2.968132E+02 | −1.377289E+04 | 5.087437E+04 | −2.896880E+02 |
| A20 | −3.332851E+03 | 6.334106E+03 | −2.500307E+04 | 9.553158E+01 |
| | Sixth Surface | Seventh Surface | Eighth Surface | Ninth Surface |
| k | 1.708454E+00 | −6.369201E+00 | 9.044934E−02 | −4.175765E+00 |
| A4 | 4.213883E−02 | −1.213493E+00 | −5.498489E−01 | −2.936426E−01 |
| A6 | 8.146828E−03 | 5.214489E+00 | 6.888269E−01 | 3.946965E−01 |
| A8 | −9.807687E−02 | −1.695604E+01 | −6.841782E−01 | −4.186349E−01 |
| A10 | 1.519130E+00 | 3.960415E+01 | 5.503375E−01 | 3.164433E−01 |
| A12 | −6.410888E+00 | −6.237039E+01 | −3.578959E−01 | −1.646355E−01 |

TABLE 1-continued

| Example 1 | | | |
|---|---|---|---|
| A14 | 1.197427E+01 | 6.474140E+01 | 1.890245E−01 | 5.639380E−02 |
| A16 | −1.047108E+01 | −4.211676E+01 | −7.231125E−02 | −1.189755E−02 |
| A18 | 3.396989E+00 | 1.541324E+01 | 1.621474E−02 | 1.370249E−03 |
| A20 | 0.000000E+00 | −2.405607E+00 | −1.520138E−03 | −6.416131E−05 |

The imaging lens in Example 1 satisfies conditional expressions (1) to (20) as shown in Table 5.

Figure 2:
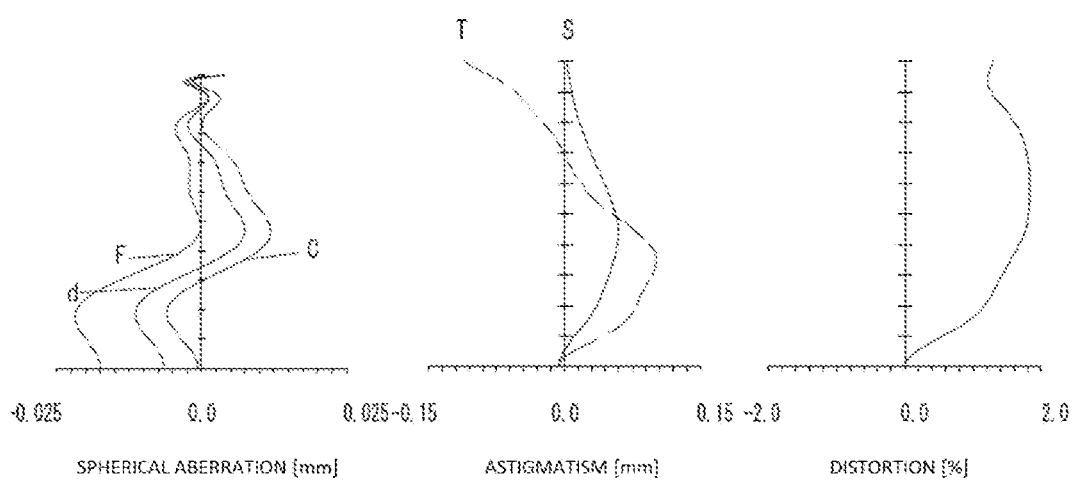
FIG. 2 shows spherical aberration, astigmatism, and distortion of the imaging lens in Example 1 according to the present invention.
Figure 3:
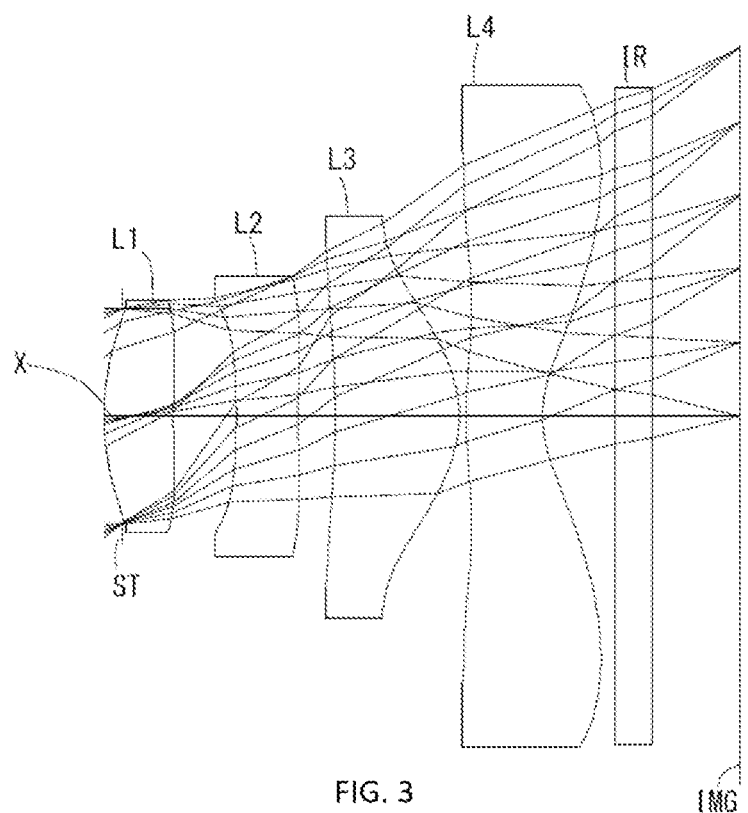
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, and 8). As shown in FIG. 2, each aberration is corrected excellently.

Example 2

The basic lens data is shown below in Table 2.

TABLE 2

| Example 2 |
|---|
| Unit mm |
| f = 2.49 |
| Fno = 2.00 |
| ω(°) = 39.2 |
| ih = 2.1 |
| TTL = 3.48 |

Surface Data

| i | r | d | Nd | vd | |
|---|---|---|---|---|---|
| (Object) | Infinity | Infinity | | | |
| 1(Stop) | Infinity | −0.1000 | | | |
| 2* | 1.4362 | 0.3869 | 1.544 | 55.93 | (vd1) |
| 3* | 8.4895 | 0.3501 | | | |
| 4* | −8.4935 | 0.3480 | 1.671 | 19.24 | (vd2) |
| 5* | 6.5818 | 0.2047 | | | |
| 6* | −5.1494 | 0.6941 | 1.535 | 55.69 | (vd3) |
| 7* | −0.6575 | 0.0382 | | | |
| 8* | 2.4157 | 0.4273 | 1.535 | 55.69 | (vd4) |
| 9* | 0.5816 | 0.4000 | | | |
| 10 | Infinity | 0.2100 | 1.517 | 64.20 | |
| 11 | Infinity | 0.4887 | | | |
| Image Plane | | | | | |

Constituent Lens Data

| Lens | Start Surface | Focal Length |
|---|---|---|
| 1 | 2 | 3.116 |
| 2 | 4 | −5.478 |
| 3 | 6 | 1.337 |
| 4 | 8 | −1.559 |

Aspheric Surface Data

| | Second Surface | Third Surface | Fourth Surface | Fifth Surface |
|---|---|---|---|---|
| k | −6.083119E−01 | −2.356106E−02 | 6.726057E+00 | 4.753408E+01 |
| A4 | 2.736335E−01 | −1.279459E−01 | −6.511023E−01 | −2.602159E−01 |
| A6 | −6.479182E+00 | −1.730705E+00 | 3.799502E+00 | −5.382183E−01 |
| A8 | 7.948164E+01 | 2.205103E+01 | −4.374215E+01 | 7.091830E+00 |
| A10 | −6.120656E+02 | −1.897268E+02 | 3.006793E+02 | −4.261910E+01 |
| A12 | 2.998906E+03 | 9.702521E+02 | −1.332588E+03 | 1.459654E+02 |
| A14 | −9.416302E+03 | −3.039543E+03 | 3.764024E+03 | −3.072272E+02 |
| A16 | 1.833274E+04 | 5.689591E+03 | −6.500155E+03 | 3.969777E+02 |
| A18 | −2.016711E+04 | −5.829291E+03 | 6.277734E+03 | −2.885133E+02 |
| A20 | 9.577422E+03 | 2.510927E+03 | −2.602881E+03 | 9.036005E+01 |

| | Sixth Surface | Seventh Surface | Eighth Surface | Ninth Surface |
|---|---|---|---|---|
| k | 1.708454E+00 | −6.293960E+00 | 2.117546E−01 | −4.286504E+00 |
| A4 | 8.126334E−02 | −1.259868E+00 | −5.486238E−01 | −2.791426E−01 |
| A6 | −3.971399E−01 | 5.521140E+00 | 7.200783E−01 | 3.789363E−01 |
| A8 | 2.167388E+00 | −1.809949E+01 | −6.926012E−01 | −4.070574E−01 |

TABLE 2-continued

| | Example 2 | | | |
|---|---|---|---|---|
| A10 | −5.423063E+00 | 4.232143E+01 | 4.741539E−01 | 3.165104E−01 |
| A12 | 6.548075E+00 | −6.620858E+01 | −2.387909E−01 | −1.737037E−01 |
| A14 | −3.063635E+00 | 6.789421E+01 | 1.060233E−01 | 6.463250E−02 |
| A16 | −5.335051E−01 | −4.360956E+01 | −4.253465E−02 | −1.530673E−02 |
| A18 | 6.358798E−01 | 1.581305E+01 | 1.130099E−02 | 2.061684E−03 |
| A20 | 0.000000E+00 | −2.458770E+00 | −1.295854E−03 | −1.196326E−04 |

The imaging lens in Example 2 satisfies conditional expressions (1) to (20) as shown in Table 5.

Figure 4:
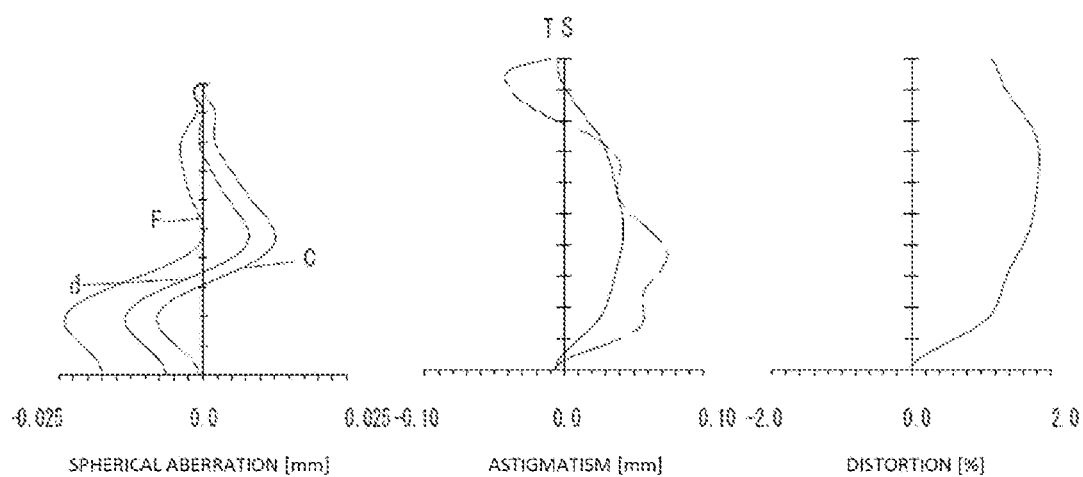
FIG. 4 shows spherical aberration, astigmatism, and distortion of the imaging lens in Example 2 according to the present invention.
Figure 5:
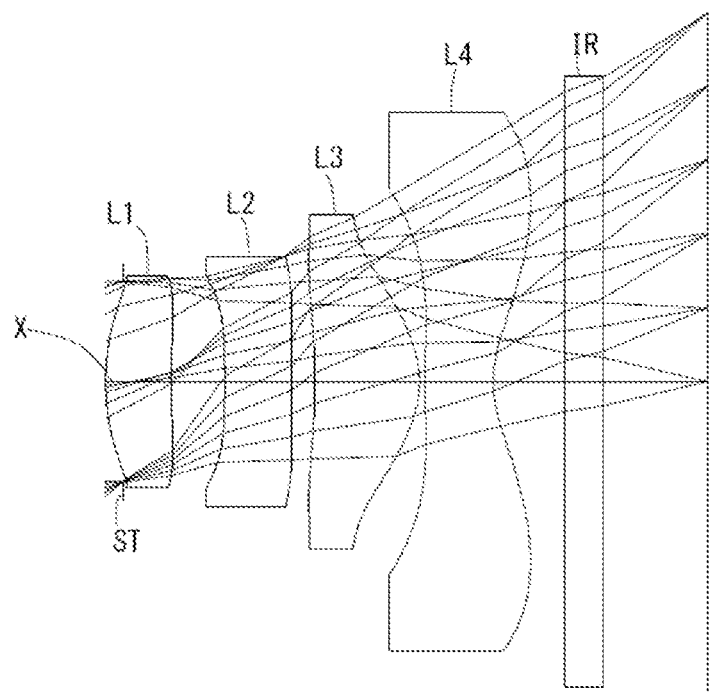
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

| Example 3 |
|---|
| Unit mm |

$f = 2.49$
$Fno = 2.00$
$\omega(°) = 39.2$
$ih = 2.1$
$TTL = 3.29$

Surface Data

| i | r | d | Nd | vd | |
|---|---|---|---|---|---|
| (Object) | Infinity | Infinity | | | |
| 1(Stop) | Infinity | −0.1000 | | | |
| 2* | 1.2617 | 0.3666 | 1.544 | 55.93 | (vd1) |
| 3* | 5.1285 | 0.2998 | | | |
| 4* | −7.2590 | 0.3713 | 1.671 | 19.24 | (vd2) |
| 5* | 7.8532 | 0.1306 | | | |
| 6* | −3.7034 | 0.5857 | 1.535 | 55.69 | (vd3) |
| 7* | −0.5475 | 0.0300 | | | |
| 8* | 5.6521 | 0.3800 | 1.535 | 55.69 | (vd4) |
| 9* | 0.5784 | 0.4000 | | | |
| 10 | Infinity | 0.2100 | 1.517 | 64.20 | |
| 11 | Infinity | 0.5881 | | | |
| Image Plane | | | | | |

Constituent Lens Data

| Lens | Start Surface | Focal Length |
|---|---|---|
| 1 | 2 | 2.975 |
| 2 | 4 | −5.569 |
| 3 | 6 | 1.128 |
| 4 | 8 | −1.237 |

Aspheric Surface Data

| | Second Surface | Third Surface | Fourth Surface | Fifth Surface |
|---|---|---|---|---|
| k | −7.440462E−01 | −1.951404E−02 | 6.728139E+00 | 4.533146E+01 |
| A4 | 2.399023E−01 | −1.883614E−01 | −7.784061E−01 | −3.933869E−01 |
| A6 | −5.532907E+00 | −1.918742E+00 | 6.362141E+00 | 1.125170E+00 |
| A8 | 6.481492E+01 | 3.022546E+01 | −1.118778E+02 | −2.986502E+00 |
| A10 | −4.298186E+02 | −3.336355E+02 | 1.108821E+03 | −3.261591E+01 |
| A12 | 1.427935E+03 | 2.133653E+03 | −6.883014E+03 | 3.094510E+02 |
| A14 | −9.711916E+02 | −8.251448E+03 | 2.682131E+04 | −1.193928E+03 |
| A16 | −8.530385E+03 | 1.888694E+04 | −6.356829E+04 | 2.473726E+03 |
| A18 | 2.596084E+04 | −2.347375E+04 | 8.386389E+04 | −2.693252E+03 |
| A20 | −2.337022E+04 | 1.217497E+04 | −4.721576E+04 | 1.211606E+03 |

| | Sixth Surface | Seventh Surface | Eighth Surface | Ninth Surface |
|---|---|---|---|---|
| k | 1.707559E+00 | −6.098760E+00 | −5.477247E+01 | −5.702765E+00 |
| A4 | −4.170937E−02 | −1.967379E+00 | −4.724670E−01 | −3.129298E−01 |

TABLE 3-continued

| | Example 3 | | | |
|---|---|---|---|---|
| A6 | 2.238152E+00 | 1.292311E+01 | 1.128452E+00 | 3.774380E−01 |
| A8 | −1.414982E+01 | −6.158577E+01 | −4.763678E+00 | −4.036669E−01 |
| A10 | 5.280090E+01 | 2.036747E+02 | 1.408246E+01 | 3.170163E−01 |
| A12 | −1.221427E+02 | −4.519766E+02 | −2.581208E+01 | −1.711978E−01 |
| A14 | 1.762036E+02 | 6.616916E+02 | 2.924977E+01 | 5.632221E−02 |
| A16 | −1.455906E+02 | −6.070432E+02 | −1.976164E+01 | −8.122785E−03 |
| A18 | 5.169481E+01 | 3.129581E+02 | 7.199179E+00 | −6.307093E−04 |
| A20 | 0.000000E+00 | −6.871682E+01 | −1.071024E+00 | 2.606036E−04 |

The imaging lens in Example 3 satisfies conditional expressions (1) to (20) as shown in Table 5.

Figure 6:
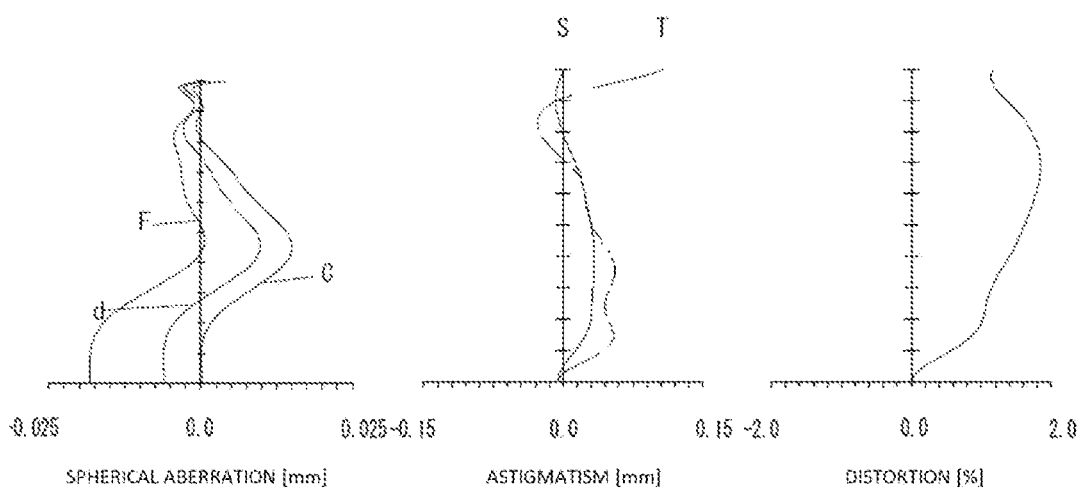
FIG. 6 shows spherical aberration, astigmatism, and distortion of the imaging lens in Example 3 according to the present invention.
Figure 7:
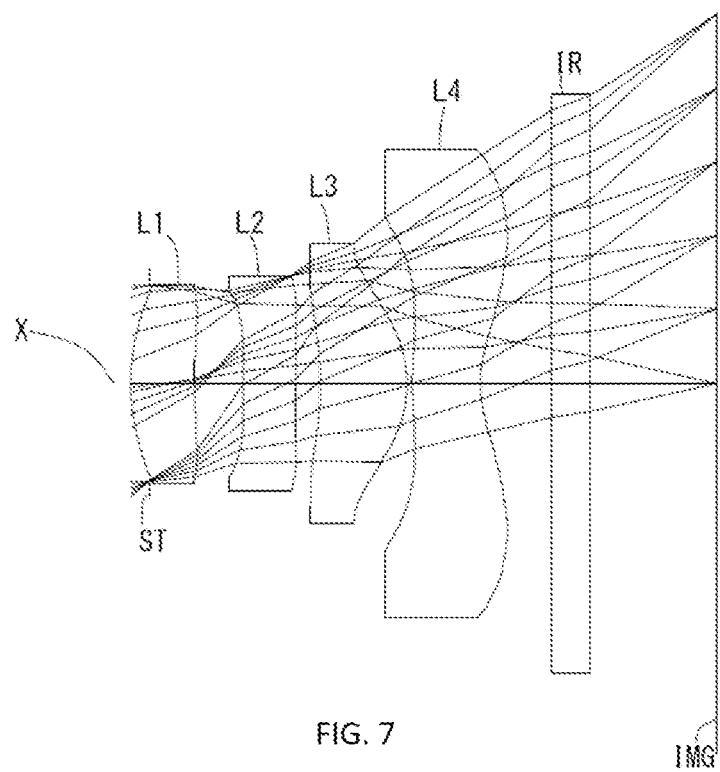
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4

Unit mm $f = 2.49$
$Fno = 2.20$
$\omega(°) = 39.2$
$ih = 2.1$
$TTL = 3.20$

Surface Data

| i | r | d | Nd | vd | |
|---|---|---|---|---|---|
| (Object) | Infinity | Infinity | | | |
| 1(Stop) | Infinity | −0.1000 | | | |
| 2* | 1.2214 | 0.3582 | 1.544 | 55.93 | (vd1) |
| 3* | 4.1398 | 0.2707 | | | |
| 4* | −20.3883 | 0.2936 | 1.671 | 19.24 | (vd2) |
| 5* | 10.4024 | 0.1366 | | | |
| 6* | −1.5273 | 0.4813 | 1.535 | 55.69 | (vd3) |
| 7* | −0.6945 | 0.0300 | | | |
| 8* | 1.3903 | 0.3800 | 1.535 | 55.69 | (vd4) |
| 9* | 0.6306 | 0.4000 | | | |
| 10 | Infinity | 0.2100 | 1.517 | 64.20 | |
| 11 | Infinity | 0.7069 | | | |
| Image Plane | | | | | |

Constituent Lens Data

| Lens | Start Surface | Focal Length |
|---|---|---|
| 1 | 2 | 3.051 |
| 2 | 4 | −10.230 |
| 3 | 6 | 1.982 |
| 4 | 8 | −2.613 |

Aspheric Surface Data

| | Second Surface | Third Surface | Fourth Surface | Fifth Surface |
|---|---|---|---|---|
| k | −5.708032E−01 | −1.951406E−02 | 6.728139E+00 | 6.598646E+01 |
| A4 | 5.375971E−01 | −9.214543E−02 | −1.068658E+00 | −4.741737E−01 |
| A6 | −1.587157E+01 | −8.103435E+00 | 8.913027E+00 | 6.933067E+00 |
| A8 | 2.567906E+02 | 1.677450E+02 | −1.046275E+02 | −9.987711E+01 |
| A10 | −2.557248E+03 | −2.083821E+03 | 2.605856E+02 | 8.263281E+02 |
| A12 | 1.611617E+04 | 1.549265E+04 | 4.638029E+03 | −4.330121E+03 |
| A14 | −6.472253E+04 | −7.092083E+04 | −5.048121E+04 | 1.439660E+04 |
| A16 | 1.605154E+05 | 1.958281E+05 | 2.229619E+05 | −2.947032E+04 |

TABLE 4-continued

| | Example 4 | | | |
|---|---|---|---|---|
| A18 | −2.243029E+05 | −2.994842E+05 | −4.765353E+05 | 3.393274E+04 |
| A20 | 1.351544E+05 | 1.950918E+05 | 4.052004E+05 | −1.682114E+04 |
| | Sixth Surface | Seventh Surface | Eighth Surface | Ninth Surface |
| k | 8.554460E−01 | −6.206285E+00 | −6.000000E+01 | −5.852191E+00 |
| A4 | 4.384846E−01 | −3.997193E+00 | −1.835448E+00 | −6.968965E−01 |
| A6 | 1.254507E+00 | 3.842307E+01 | 1.438755E+01 | 2.025294E+00 |
| A8 | −6.209590E+00 | −2.603389E+02 | −8.174367E+01 | −5.122504E+00 |
| A10 | 2.121020E+01 | 1.224483E+03 | 2.997097E+02 | 9.112584E+00 |
| A12 | −5.041536E+01 | −3.901635E+03 | −7.199751E+02 | −1.094663E+01 |
| A14 | 6.478168E+01 | 8.235683E+03 | 1.123790E+03 | 8.617647E+00 |
| A16 | −3.209583E+01 | −1.094051E+04 | −1.094626E+03 | −4.239675E+00 |
| A18 | 0.000000E+00 | 8.231888E+03 | 6.026591E+02 | 1.177557E+00 |
| A20 | 0.000000E+00 | −2.664944E+03 | −1.427368E+02 | −1.404405E−01 |

The imaging lens in Example 4 satisfies conditional expressions (1) to (20) as shown in Table 5.

Figure 8:
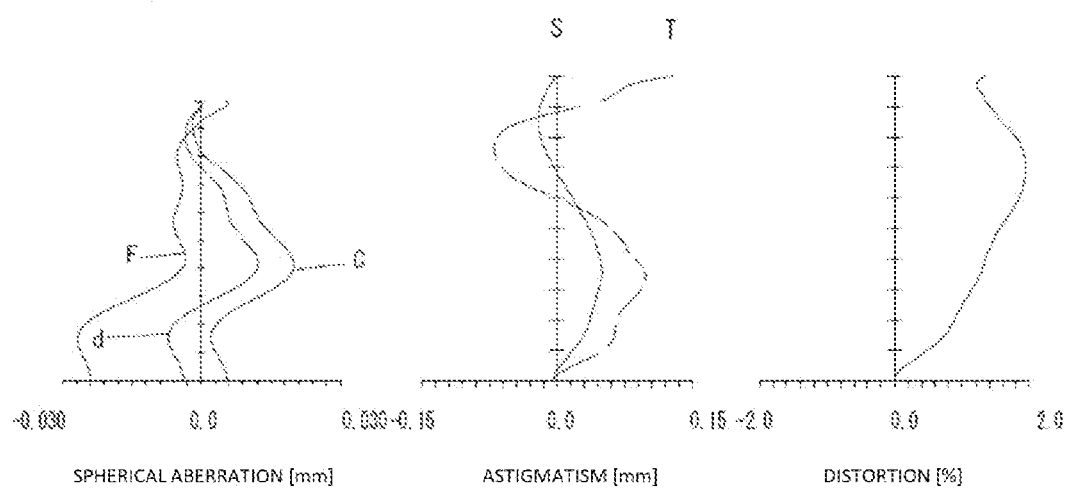
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

In table 5, values of conditional expressions (1) to (20) related to the Examples 1 to 4 are shown.

TABLE 5

| | Conditional Expressions | Example 1 | Example 2 | Example 3 | Example 4 |
|---|---|---|---|---|---|
| (1) | vd2 | 19.24 | 19.24 | 19.24 | 19.24 |
| (2) | r2/f | 3.38 | 3.41 | 2.06 | 1.67 |
| (3) | r4/f | 2.63 | 2.65 | 3.16 | 4.18 |
| (4) | r7/T3 | 45.46 | 63.21 | 188.40 | 46.34 |
| (5) | (T2/f) × 100 | 7.60 | 8.23 | 5.25 | 5.49 |
| (6) | r7/T2 | 13.14 | 11.80 | 43.29 | 10.18 |
| (7) | r2/r8 | 14.02 | 14.60 | 8.87 | 6.57 |
| (8) | r4/r8 | 10.89 | 11.32 | 13.58 | 16.50 |
| (9) | f2/f4 | 3.47 | 3.51 | 4.50 | 3.91 |
| (10) | vd3/vd4 | 1.00 | 1.00 | 1.00 | 1.00 |
| (11) | T2/T1 | 0.56 | 0.58 | 0.44 | 0.50 |
| (12) | r3/f | −3.59 | −3.41 | −2.92 | −8.20 |
| (13) | r3/r7 | −3.59 | −3.52 | −1.28 | −14.67 |
| (14) | r5/T3 | −103.48 | −134.74 | −123.45 | −50.91 |
| (15) | r2/r3 | −0.94 | −1.00 | −0.71 | −0.20 |
| (16) | r3/r4 | −1.37 | −1.29 | −0.92 | −1.96 |
| (17) | r8/D4 | 1.41 | 1.36 | 1.52 | 1.66 |
| (18) | (D1/f1) × 100 | 12.39 | 12.42 | 12.32 | 11.74 |
| (19) | f2/f | −2.24 | −2.20 | −2.24 | −4.11 |
| (20) | f2/T2 | −29.49 | −26.76 | −42.65 | −74.90 |

When the imaging lens according to the present invention is adopted to a product with the camera function, there is realized contribution to the low profile and the low F-number of the camera, and also high performance thereof.

DESCRIPTION OF REFERENCE NUMERALS

ST: aperture stop
L1: first lens
L2: second lens
L3: third lens
L4: fourth lens
IR: filter
IMG: imaging plane

What is claimed is:

1. An imaging lens comprising in order from an object side to an image side,
a first lens with positive refractive power being formed in a meniscus shape having an object-side surface being convex in a paraxial region,
a second lens with negative refractive power in a paraxial region,
a third lens with positive refractive power having an object-side surface being concave in a paraxial region, and
a fourth lens with negative refractive power having an image-side surface being concave in a paraxial region,
wherein the following conditional expressions (1), (2), (3), (4) and 18 are satisfied:

$$9.00 < vd2 < 29.00 \quad (1)$$

$$0.55 < r2/f < 5.25 \quad (2)$$

$$2.15 < r4/f < 6.00 \quad (3)$$

$$35.50 < r7/T3 < 235.00 \quad (4)$$

$$5.00 < (D1/f1) \times 100 < 14.00 \quad (18)$$

where
vd2: an abbe number at d-ray of the second lens,
r2: a paraxial curvature radius of an image-side surface of the first lens, f: a focal length of an overall optical system of the imaging lens,
r4: a paraxial curvature radius of an image-side surface of the second lens,
r7: a paraxial curvature radius of an object-side surface of the fourth lens,
T3: a distance along the optical axis from an image-side surface of the third lens to an object-side surface of the fourth lens,
D1: a thickness along the optical axis of the first lens, and
f1: a focal length of the first lens.

2. The imaging lens according to claim 1, wherein an object-side surface of said second lens is concave in the paraxial region.

3. The imaging lens according to claim 1, wherein the following conditional expression (5) is satisfied:

$$2.50 < (T2/f) \times 100 < 10.50 \quad (5)$$

where
T2: a distance along the optical axis from an image-side surface of the second lens to an object-side surface of the third lens, and
f: a focal length of the overall optical system of the imaging lens.

4. The imaging lens according to claim 1, wherein the following conditional expression (6) is satisfied:

$$8.00 < r7/T2 < 65.00 \quad (6)$$

where
- r7: a paraxial curvature radius of an object-side surface of the fourth lens, and
- T2: a distance along the optical axis from an image-side surface of the second lens to an object-side surface of the third lens.

5. The imaging lens according to claim 1, wherein the following conditional expression (7) is satisfied:

$$5.00 < r2/r8 < 18.00 \tag{7}$$

where
- r2: a paraxial curvature radius of an image-side surface of the first lens, and r8: a paraxial curvature radius of an image-side surface of the fourth lens.

6. The imaging lens according to claim 1, wherein the following conditional expression (8) is satisfied:

$$5.00 < r4/r8 < 20.00 \tag{8}$$

where
- r4: a paraxial curvature radius of an image-side surface of the second lens, and r8: a paraxial curvature radius of an image-side surface of the fourth lens.

7. The imaging lens according to claim 1, wherein the following conditional expression (9) is satisfied:

$$2.95 < f2/f4 < 5.70 \tag{9}$$

where
- f2: a focal length of the second lens, and f4: a focal length of the fourth lens.

* * * * *